(12) United States Patent
Huang et al.

(10) Patent No.: US 12,720,443 B2
(45) Date of Patent: Aug. 25, 2026

(54) ELECTRONIC DEVICE WITH DYNAMIC RESOURCE CONTROL POLICY

(71) Applicant: MEDIATEK INC., Hsinchu City (TW)

(72) Inventors: Yu-Hua Huang, Hsinchu City (TW); Wei-Lun Liu, Hsinchu City (TW); Guo-Huei Chang, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 295 days.

(21) Appl. No.: 18/604,651

(22) Filed: Mar. 14, 2024

(65) Prior Publication Data

US 2025/0294473 A1 Sep. 18, 2025

(51) Int. Cl.
*H04W 52/28* (2009.01)
*H04W 72/50* (2023.01)

(52) U.S. Cl.
CPC ......... *H04W 52/288* (2013.01); *H04W 72/50* (2023.01)

(58) Field of Classification Search
CPC .... H04W 52/288; H04W 72/50; G06F 1/3278
USPC .................................................. 375/219–222
See application file for complete search history.

(56) References Cited

U.S. PATENT DOCUMENTS 10,966,153 B2 * 3/2021 Heiska .............. H04W 52/0229
2015/0346807 A1 * 12/2015 Homchaudhuri ..... G06F 1/3278 713/323

* cited by examiner

*Primary Examiner* — Chieh M Fan
(74) *Attorney, Agent, or Firm* — McClure, Qualey & Rodack, LLP

(57) ABSTRACT

An electronic device includes a modem and a system power controller. The modem receives a control signal, and sends out a resource request based on the control signal when the modem determines to operate in a dynamic mode for scheduling a plurality of resources. The system power controller receives the control signal from the modem, and supplies power to at least one of the resources based on the resource request. The modem includes a modem power controller to determine, for each of the resources, whether to operate in the dynamic mode or a static mode, and output an enabled signal or a disabled signal, respectively, based on the determination for each of the resources. The control signal is generated based on different requirements on each of the resources.

19 Claims, 2 Drawing Sheets

ELECTRONIC DEVICE WITH DYNAMIC RESOURCE CONTROL POLICY

FIELD OF THE INVENTION

The present invention relates to an electronic device, and, in particular, to an electronic device with a dynamic resource control policy.

DESCRIPTION OF THE RELATED ART

A Physical Downlink Control Channel (PDCCH) is a physical channel that contains control information for the downlink data (DCI) to be sent to a UE in the current subframe and uplink (UL) grants for the UE that want to send uplink data. In a radio frequency system-on-chip (RFSOC), dynamic random-access memory, clocks, intra buses, and a power manager integrated circuit (IC) are commonly called platform resources.

In the PDCCH scenario, the RFSOC does not need to continuously utilize all system resources, but the current design of the RFSOC uses up the all system resources, resulting in more power consumption.

BRIEF SUMMARY OF THE INVENTION

An embodiment of the present invention provides an electronic device. The electronic device includes a modem and a system power controller. The modem receives a control signal, and sends out a resource request based on the control signal when the modem determines to operate in a dynamic mode for scheduling a plurality of resources. The system power controller receives the resource request from the modem, and supplies power to at least one of the resources based on the resource request. The modem includes a modem power controller to determine, for each of the resources, whether to operate in the dynamic mode or a static mode, and output an enabled signal or a disabled signal, respectively, based on the determination for each of the resources. The control signal is generated based on different requirements on each of the resources.

According to the electronic device described above, the system power controller sends an acknowledgment message back for each of the resources to the modem respectively, after the system power controller supplies power to each of the resources.

According to the electronic device described above, the control signal is generated by a processor executing the dynamic resource-control software.

According to the electronic device described above, each of the resources include a dynamic random-access memory, a clock, an infra bus, a bus phased-locked loop (PLL) and a power management integrated circuit.

According to the electronic device described above, the modem receives configurations from a base station through a Physical Downlink Control Channel (PDCCH).

According to the electronic device described above, the modem power controller outputs the enabled signal for one of the resources when determining to operate in the dynamic mode, and outputs the disabled signal for one of the resources when determining to operate in the static mode.

According to the electronic device described above, the modem further includes a logic circuit. The logic circuit receives the enabled signal and sends the resource request to the system power controller when the modem power controller determines to operate in the dynamic mode. The logic circuit receives the disabled signal and transfer a normal resource request from the modem controller to the system power controller when the modem power controller determines to operate in the static mode.

According to the electronic device described above, the logic circuit includes a first OR gate and a plurality of first multiplexers. The first OR gate receives the resource request from the modem power controller and performs an OR operation on the resource request. Each of the first multiplexers has a first input end to receive the resource request, a second input end to receive the control signal, and a control end to receive the enabled signal or the disabled signal for each of the resources from the modem power controller.

According to the electronic device described above, when the modem power controller determines to operate in the dynamic mode, at least one of the first multiplexers receives the enable signal through the control end, so that at least one of the first multiplexers output the resource request to the system power controller based on the control signal in the second input.

According to the electronic device described above, when the modem power controller determines to operate in the static mode, at least one of the first multiplexers receives the disable signal through the control end, so that at least one of the first multiplexers output the normal resource request from the modem controller to the system power controller.

According to the electronic device described above, the logic circuit further includes second OR gates and an AND gate. Each of the second OR gates has a first input end to receive the enabled signal or the disabled signal for each of the resources from the modem power controller, and a second input end to receive an acknowledgment message for each of the resources from the system power controller, and performs an OR operation on the enabled signal and the acknowledgment message, or the disabled signal and the acknowledgment message to obtain a calculation result for each of the resources. The AND gate performs an AND operation on the calculation result for each of the resources to obtain a ready message, and sends the ready message to the modem power controller.

According to the electronic device described above, when the modem power controller determines to operate in the dynamic mode, at least one of the second OR gates receives the enabled signal through the first input end, so that the calculation result for each of the resources is equal to the enable signal for each of the resources, and the acknowledgment message for each of the resources is masked.

According to the electronic device described above, when the modem power controller determines to operate in the static mode, each of the second OR gates receives the disable signal through the first input end, so that the calculation result for each of the resources is equal to the acknowledgment message for each of the resources from the system power controller.

According to the electronic device described above, the modem power controller outputs a protection signal to the logic circuit when the electronic device is turned off.

According to the electronic device described above, the logic circuit further includes a plurality of second multiplexers. Each of the second multiplexers has a first input end to receive a logic-low signal, a second input end electrically connected to each of the first multiplexers, and a control end to receive a protection signal from the modem power controller when the electronic device is turned off.

According to the electronic device described above, when each of the second multiplexers receives the protection signal through the control end, the second multiplexers send the logic-low signal to the system power controller, so that the resources are released.

According to the electronic device described above, when each of the second multiplexers does not receive the protection signal through the control end, the second multiplexers send the resource request to the system power controller.

According to the electronic device described above, after the modem power controller receives the ready message from the AND gate of the logic circuit, the modem power controller knows that the system power controller has supplied power to each of the resources.

According to the electronic device described above, the processor executing the dynamic resource-control software calculates lead time when the system power controller supplies power to each of the resources based on the control signal.

According to the electronic device described above, the modem includes a plurality of subsystems. The modem power controller controls switches in each of the subsystems to control timing for supplying the power to the subsystems.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
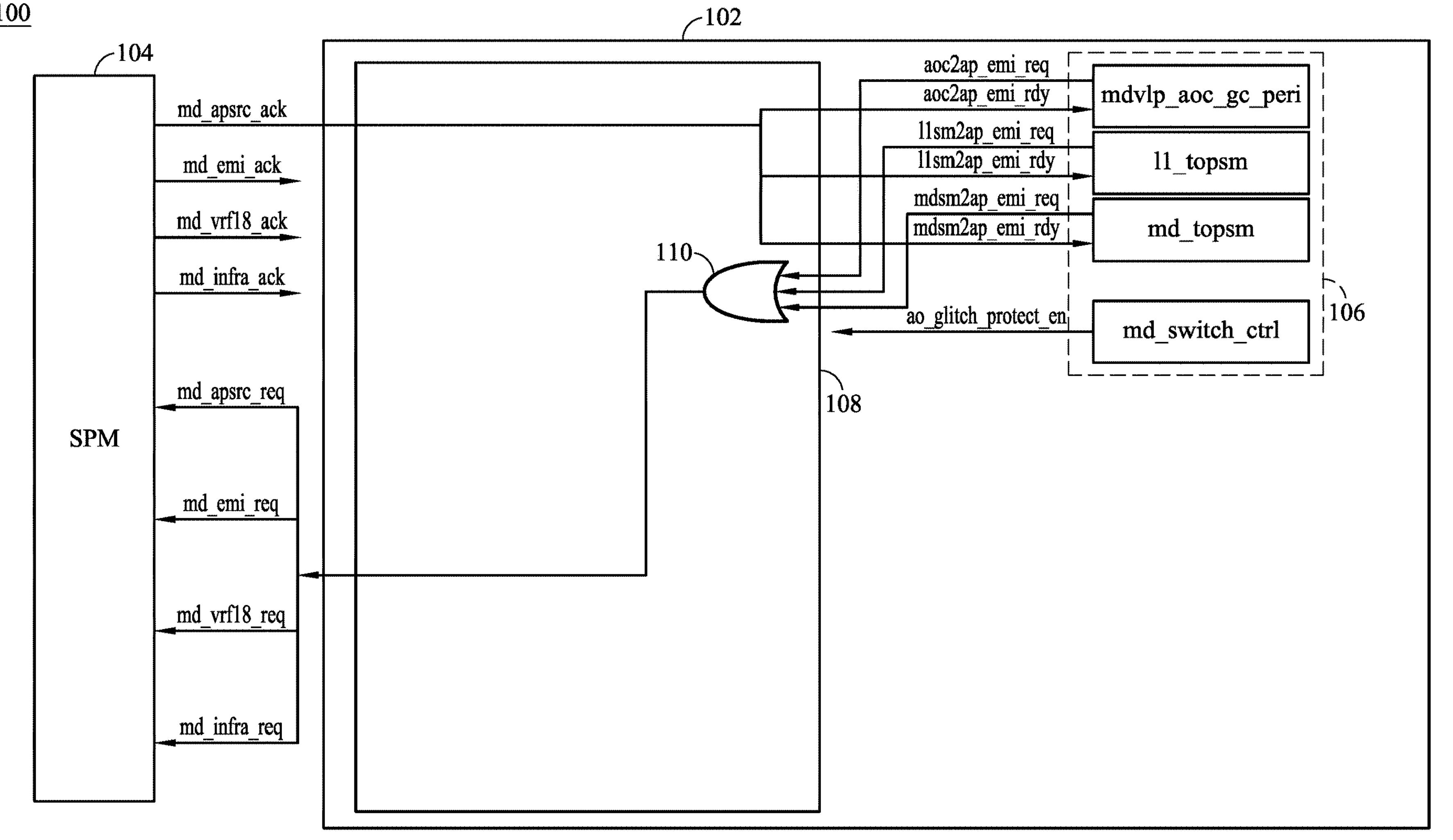
FIG. 1 is a schematic diagram of an electronic device 100 in the prior art.

In order to make the above purposes, features, and advantages of some embodiments of the present invention more comprehensible, the following is a detailed description in conjunction with the accompanying drawing.

Certain terms are used throughout the description and following claims to refer to particular components. As one skilled in the art will understand, electronic equipment manufacturers may refer to a component by different names. This document does not intend to distinguish between components that differ in name but not function. It is understood that the words "comprise", "have" and "include" are used in an open-ended fashion, and thus should be interpreted to mean "include, but not limited to . . . ". Thus, when the terms "comprise", "have" and/or "include" used in the present invention are used to indicate the existence of specific technical features, values, method steps, operations, units and/or components. However, it does not exclude the possibility that more technical features, numerical values, method steps, work processes, units, components, or any combination of the above can be added.

The directional terms used throughout the description and following claims, such as: "on", "up", "above", "down", "below", "front", "rear", "back", "left", "right", etc., are only directions referring to the drawings. Therefore, the directional terms are used for explaining and not used for limiting the present invention. Regarding the drawings, the drawings show the general characteristics of methods, structures, and/or materials used in specific embodiments. However, the drawings should not be construed as defining or limiting the scope or properties encompassed by these embodiments. For example, for clarity, the relative size, thickness, and position of each layer, each area, and/or each structure may be reduced or enlarged.

When the corresponding component such as layer or area is referred to as being "on another component", it may be directly on this other component, or other components may exist between them. On the other hand, when the component is referred to as being "directly on another component (or the variant thereof)", there is no component between them. Furthermore, when the corresponding component is referred to as being "on another component", the corresponding component and the other component have a disposition relationship along a top-view/vertical direction, the corresponding component may be below or above the other component, and the disposition relationship along the top-view/vertical direction is determined by the orientation of the device.

It should be understood that when a component or layer is referred to as being "connected to" another component or layer, it can be directly connected to this other component or layer, or intervening components or layers may be present. In contrast, when a component is referred to as being "directly connected to" another component or layer, there are no intervening components or layers present.

The electrical connection or coupling described in this disclosure may refer to direct connection or indirect connection. In the case of direct connection, the endpoints of the components on the two circuits are directly connected or connected to each other by a conductor line segment, while in the case of indirect connection, there are switches, diodes, capacitors, inductors, resistors, other suitable components, or a combination of the above components between the endpoints of the components on the two circuits, but the intermediate component is not limited thereto.

The words "first", "second", "third", "fourth", "fifth", and "sixth" are used to describe components. They are not used to indicate the priority order of or advance relationship, but only to distinguish components with the same name.

It should be noted that the technical features in different embodiments described in the following can be replaced, recombined, or mixed with one another to constitute another embodiment without departing from the spirit of the present invention.

FIG. 1 is a schematic diagram of an electronic device 100 in the prior art. In some embodiments, the electronic device 100 may be a traditional radio frequency system on chip (RFSOC). In some embodiments, the electronic device 100 may be a UE such as a portable or mobile apparatus, a wearable apparatus, a wireless communication apparatus or a computing apparatus. For instance, electronic device 100 may be implemented in a smartphone, a smartwatch, a personal digital assistant, a digital camera, or a computing equipment such as a tablet computer, a laptop computer or a notebook computer. electronic device 100 may also be a part of a machine type apparatus, which may be an IoT, NB-IoT, or IIOT apparatus such as an immobile or a stationary apparatus, a home apparatus, a wire communication apparatus or a computing apparatus. For instance, electronic device 100 may be implemented in a smart thermostat, a smart fridge, a smart door lock, a wireless speaker or a home control center. Alternatively, electronic device 100 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. As shown in FIG. 1, the electronic device 100 includes a modem 102 and a system power management (SPM) 104. The modem 102 includes a modem power controller 106 and a logic circuit 108. The modem power controller 106 includes four function blocks, such as a function block mdvlp_aoc_gc_peri, a function block 11_topsm, a function block md_topsm, and a function block md_switch_ctrl. The modem 102 includes a plurality of subsystems. Each of the subsystems corresponds to a specific function. The modem power controller 106 utilizes the function block mdvlp_aoc_gc_peri to decrease power consumption when the modem 102 enters a sleep mode/standby state. The function block mdvlp_aoc_gc_peri, the function block 11_topsm, the function block md_topsm, and the function block md_switch_ctrl may be software, hardware, or the combination of the software and the hardware. In an example, the function block mdvlp_aoc_gc_peri may be an modem buck power control circuit. In an example, the function block 11_topsm may be subsys power control unit and modem resource control central unit. In an example, the function block md_switch_ctrl may be whole modem on & off flow controller.

The modem power controller 106 utilizes the function blocks controls 11_topsm and md_topsm to control switches in each of the subsystems to control timing for supplying the power to the subsystems. Furthermore, the modem power controller 106 utilizes the function blocks controls 11_topsm and md_topsm to detect resource requirements for respective resources in different scenarios. The respective resources may include a dynamic random-access memory (DRAM), a clock, an infra bus, a bus phase-locked loop (PLL) and a power management integrated circuit (PMIC). For example, after detecting the resource requirements for the respective resources in different scenarios, the function blocks 11_topsm and md_topsm respectively output a resource request 11sm2ap_emi_req and a resource request mdsm2ap_emi_req to the logic circuit 108. Similarly, the function block mdvlp_aoc_gc_peri outputs a resource request aoc2ap_emi_req to the logic circuit 108 when the modem 102 enters the sleep mode/standby state.

The modem power controller 106 utilizes the function block md_switch_ctrl to outputs a protection signal go_glitch_protect_en when the electronic device 100 is turned off. The system power controller 104 releases the respective resources based on the protection signal go_glitch_protect_en when the electronic device 100 is turned off. The logic circuit 108 includes an OR gate 110. The OR gate 110 collects the resource request aoc2ap_emi_req, the resource request 11sm2ap_emi_req, and the resource request mdsm2ap_emi_req from the modem power controller 106, and performs OR operation on the above-mentioned collection signals. For example, if any one of the above-mentioned collection signals is a logic-high signal, the OR gate 110 may output the logic-high signal to the system power controller 104.

The logic-high signal from the OR gate 110 is divided into a source request md_apsrc_req, a source request md_emi_req, a source request mdvrf18_rq, and a source request md_infra_req corresponding to DRAM source resource request, External Memory Interface resource request, system bus PLL resource request, and infrasys resource reqeust, respectively. After receiving the logic-high signal, the system power controller 104 may supply power to the necessary buses based on the source request md_apsrc_req, supply power to switches at the path between the DRAM and the system power controller 104 based on the source request md_emi_req, supply power to switches of a main phase lock loop (PLL) based on the source request md_vrf18_req, and supply power to switches of buses and system nodes based on the source request md_infra_req.

After finishing the power supply to the respective functions, the system power controller 104 may send an acknowledgement message md_apsrc_ack, an acknowledgement message md_emi_ack, an acknowledgement message md_vrf18_ack, and an acknowledgement message md_infra_ack back to the modem power controller 106. The acknowledgement message md_emi_ack corresponds to the source request md_emi_req. The acknowledgement message md_vrf18_req corresponds to the source request md_vrf18_req. The acknowledgement message md_infra_ack corresponds to the source request md_infra_req. The acknowledgement message md_apsrc_ack is taken as an example, the acknowledgement message md_apsrc_ack is divided into a ready message aoc2ap_emi_rdy, a ready message 11sm2ap_emi_rdy, and a ready message mdsm2ap_emi_rdy. After receiving the ready message aoc2ap_emi_rdy, the ready message 11sm2ap_emi_rdy, and the ready message mdsm2ap_emi_rdy, the modem power controller 106 is indicated that the system power controller 104 has supplied power to the respective resources.

Figure 2:
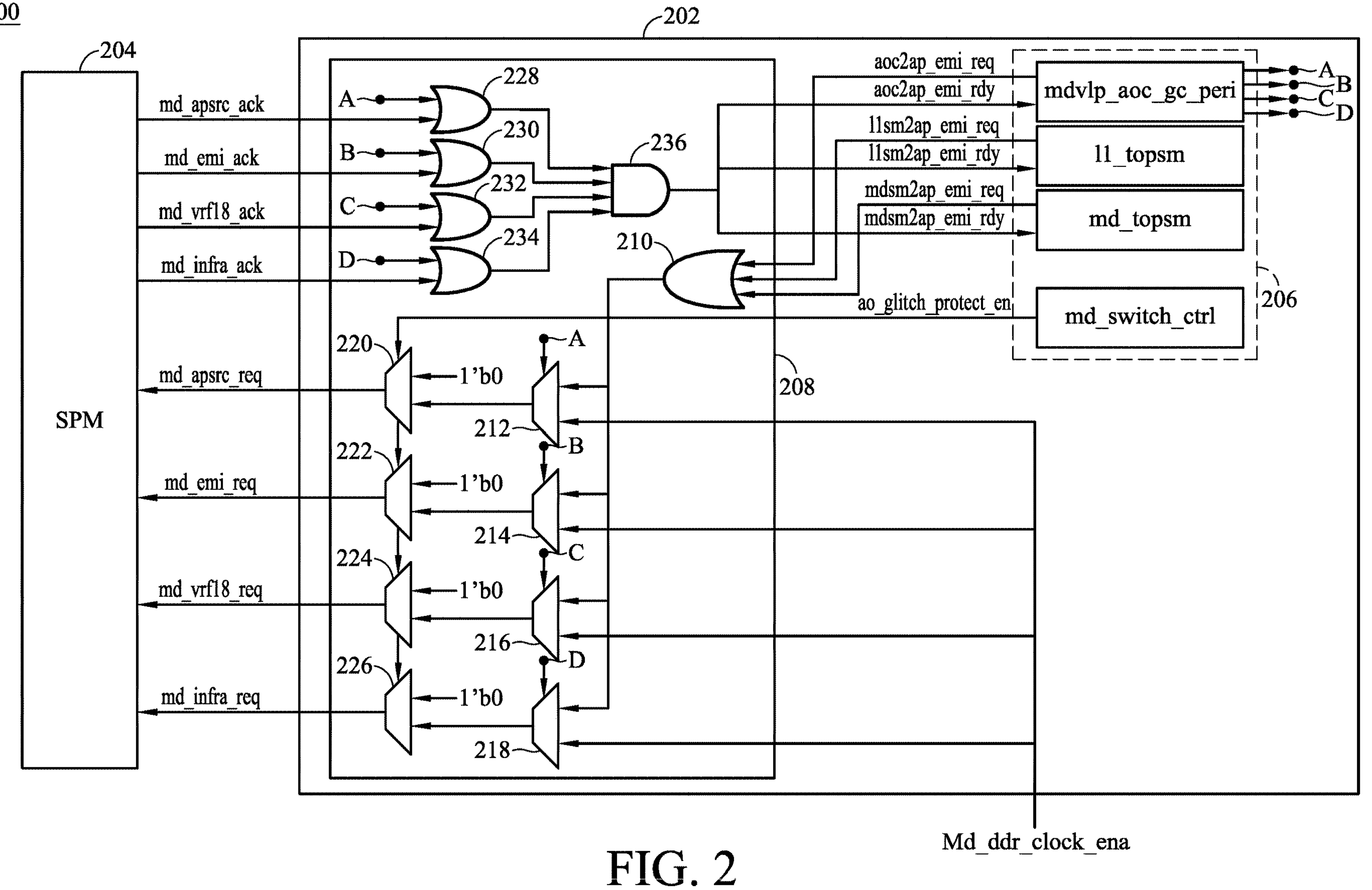
FIG. 2 is a schematic diagram of an electronic device 200 in accordance with some embodiments of the present invention.

FIG. 2 is a schematic diagram of an electronic device 200 in accordance with some embodiments of the present invention. In some embodiments, the electronic device 200 may be a radio frequency system on chip (RFSOC), but the present invention is not limited thereto. In some embodiments, the electronic device 200 may be a UE such as a portable or mobile apparatus, a wearable apparatus, a wireless communication apparatus or a computing apparatus. For instance, electronic device 200 may be implemented in a smartphone, a smartwatch, a personal digital assistant, a digital camera, or a computing equipment such as a tablet computer, a laptop computer or a notebook computer. The electronic device 200 may also be a part of a machine type apparatus, which may be an IoT, NB-IoT, or IIOT apparatus such as an immobile or a stationary apparatus, a home apparatus, a wire communication apparatus or a computing apparatus. For instance, electronic device 200 may be implemented in a smart thermostat, a smart fridge, a smart door lock, a wireless speaker or a home control center. Alternatively, electronic device 200 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. As shown in FIG. 2, the electronic device 200 includes a modem 202 and a system power controller 204. In some embodiment, the system power controller 204 may be a system power management (SPM). The modem 202 receives a control signal Md_ddr_clock_ena, determines to operate in a dynamic mode or a static mode for respective resources based on different scenarios, and sends out the control signal Md_ddr_clock_ena when the modem 202 determines to operate in the dynamic mode. The system power controller 204 receives the control signal Md_ddr_clock_ena from the modem 202, and pre-supplies power to the respective resources based on the control signal Md_ddr_clock_ena. In some embodiments, the control signal Md_ddr_clock_ena is generated based on the different scenarios.

In some embodiments, the control signal Md_ddr_clock_ena is generated by a processor (not shown) executing dynamic resource-control software. In some embodiments, the respective resources include a dynamic random-access memory (DRAM), a clock, an infra bus, a bus phase-locked loop (PLL) and a power management integrated circuit (PMIC), but the present invention is not limited thereto. The respective resources are necessarily utilized in the different scenarios. In some embodiments, the modem 202 is configured to receive configurations from a base station through a Physical Downlink Control Channel (PDCCH). The system power controller 204 sends an acknowledgment message (for example, the acknowledgement message md_apsrc_ack, the acknowledgement message md_emi_ack, the acknowledgement message md_vrf18_ack, and the acknowledgement message md_infra_ack) back to the modem 202 after the system power controller 204 pre-supplies power to the respective resources based on the control signal Md_ddr_clock_ena from the modem 202.

In detail, the modem 202 includes a modem power controller 206 and a logic circuit 208. In some embodiments, the modem power controller 206 includes four function blocks, such as the function block mdvlp_aoc_gc_peri, the function block 11_topsm, the function block md_topsm, and the function block md_switch_ctrl. In some embodiments, the function block mdvlp_aoc_gc_peri, the function block 11_topsm, the function block md_topsm, and the function block md_switch_ctrl may be software, hardware, or the combination of the software and the hardware.

The modem power controller 206 utilizes the function block mdvlp_aoc_gc_peri to determine to operate in the dynamic mode or the static mode for the respective resources based on the different scenarios. The scenarios may be at least one of the modem heavy usage mode, modem light usage mode, Modem sleep mode and modem flight mode. The modem power controller 206 further utilizes the function block mdvlp_aoc_gc_peri to decrease power consumption when the modem 202 enters the sleep mode/standby state. The modem power controller 206 further utilizes the function block mdvlp_aoc_gc_peri to output an enable signal (through nodes A, B, C, and D) for the respective resources when the modem power controller 206 determines to operate in the dynamic mode. The modem power controller 206 further utilizes the function block mdvlp_aoc_gc_peri to output a disable signal (through the nodes A, B, C, and D) for the respective resources when the modem power controller 206 determines to operate in the static mode.

In some embodiments, the modem 202 includes a plurality of subsystems (not shown). Each of the subsystems corresponds to a specific function. The modem power controller 206 utilizes the function blocks controls 11_topsm and md_topsm to control switches in each of the subsystems to control timing for supplying the power to the subsystems. Furthermore, the modem power controller 106 utilizes the function blocks 11_topsm and md_topsm to detect resource requirements for respective resources in different scenarios.

In some embodiments, the modem power controller 206 further utilizes the function block md_switch_ctrl to output a protection signal ao_glitch_protect_en to the logic circuit 208 when the electronic device 200 is turned off. The system power controller 204 releases the respective resources based on the protection signal go_glitch_protect_en when the electronic device 100 is turned off.

In some embodiments, when the modem power controller 206 determines to operate in the dynamic mode, the processor executing the dynamic resource-control software calculates lead time when the system power controller 204 pre-supplies power to the respective resources based on the control signal mdvlp_aoc_gc_peri. Therefore, the system power controller 204 pre-supplies power to the respective resources based on the lead time calculated by the dynamic resource-control software.

The logic circuit 208 receives the enable signal through the nodes A, B, C, and D and sends the control signal Md_ddr_clock_ena to the system power controller 204 when the modem power controller 206 determines to operate in the dynamic mode. In contrast, the logic circuit 208 receives the disable signal and sends a resource request (for example, a source request md_apsrc_req, a source request md_emi_req, a source request mdvrf18_rq, and a source request md_infra_req) to the system power controller 204 when the modem power controller 206 determines to operate in the static mode.

In some embodiments, the modem power controller 206 sends the resource request for the respective resources based on the different scenarios to the logic circuit 208. For example, as shown in FIG. 2, the modem power controller 206 utilizes the function block mdvlp_aoc_gc_peri to send the resource request aoc2ap_emi_req to the logic circuit 208 when the modem 202 enters the sleep mode/standby state. The modem power controller 206 utilizes the function block 11_topsm to send the resource request 11sm2ap_emi_req to the logic circuit 208 and utilizes the function block md_topsm to send the resource request mdsm2ap_emi_req to the logic circuit 208 when detecting the resource requirements for respective resources in different scenarios.

The logic circuit 208 includes an OR gate 210, a multiplexer 212, a multiplexer 214, a multiplexer 216, a multiplexer 218, a multiplexer 220, a multiplexer 222, a multiplexer 224, and a multiplexer 226, an OR gate 228, an OR gate 230, an OR gate 232, and an OR gate 234, and an AND gate 236. The OR gate 210 receives the resource request (for example, the source request aoc2ap_emi_req, the source request 11sm2ap_emi_req, and the source request mdsm2ap_emi_req) from the modem power controller 206 and performs OR operation on the resource request to generate a calculation result. The calculation result is divided into the source request md_apsrc_req, the source request md_emi_req, the source request mdvrf18_rq, and the source request md_infra_req.

In some embodiments, the first multiplexers include a multiplexer 212, a multiplexer 214, a multiplexer 216, and a multiplexer 218. The multiplexer 212 has a first input end to receive the resource request from the OR gate 210, a second input end to receive the control signal Md_ddr_clock_ena, and a control end to receive the enable signal or the disable signal from the modem power controller 206 though the node A. The multiplexer 214 has a first input end to receive the resource request from the OR gate 210, a second input end to receive the control signal Md_ddr_clock_ena, and a control end to receive the enable signal or the disable signal from the modem power controller 206 though the node B.

The multiplexer 216 has a first input end to receive the resource request from the OR gate 210, a second input end to receive the control signal Md_ddr_clock_ena, and a control end to receive the enable signal or the disable signal from the modem power controller 206 though the node C. Similarly, the multiplexer 218 has a first input end to receive the resource request from the OR gate 210, a second input end to receive the control signal Md_ddr_clock_ena, and a control end to receive the enable signal or the disable signal from the modem power controller 206 though the node D.

In some embodiments, when the modem power controller 206 determines to operate in the dynamic mode, the multiplexers 212, 214, 216, and 218 respectively receive the enable signal through their own control end, so that the multiplexers 212, 214, 216, and 218 respectively output the control signal Md_ddr_clock_ena to the multiplexer 220, 222, 224, 226. The control signal Md_ddr_clock_ena is finally received by the system power controller 204.

In contrast, when the modem power controller 206 determines to operate in the static mode, the multiplexers 212, 214, 216, and 218 respectively receive the disable signal through their own control end, so that the multiplexers 212, 214, 216, and 218 respectively output the resource request (for example, the source request md_apsrc_req, the source request md_emi_req, the source request mdvrf18_rq, and the source request md_infra_req). The resource request is finally received by the system power controller 204.

As shown in FIG. 2, the multiplexer 220 has a first input end to receive a logic-low signal **1'*b*0, a second input end electrically connected to the multiplexer 212, and a control end to receive the protection signal ao_glitch_protect_en from the modem power controller 206 when the electronic device 200 is turned off. The multiplexer 222 has a first input end to receive the logic-low signal 1'*b*0, a second input end electrically connected to the multiplexer 214, and a control end to receive the protection signal ao_glitch_protect_en from the modem power controller 206 when the electronic device 200** is turned off.

The multiplexer 224 has a first input end to receive the logic-low signal **1'*b*0, a second input end electrically connected to the multiplexer 216, and a control end to receive the protection signal ao_glitch_protect_en from the modem power controller 206 when the electronic device 200 is turned off. Similarly, the multiplexer 226 has a first input end to receive the logic-low signal 1'*b*0, a second input end electrically connected to the multiplexer 218, and a control end to receive the protection signal ao_glitch_protect_en from the modem power controller 206 when the electronic device 200** is turned off.

In some embodiments, when the multiplexers 220, 222, 224, and 226 respectively receive the protection signal ao_glitch_protect_en through the control end, the multiplexers 220, 222, 224, and 226 respectively send the logic-low signal **1'*b*0 to the system power controller 204, so that the system power controller 204 releases the respective resources. When the multiplexers 220, 222, 224, and 226 do not respectively receive the protection signal ao_glitch_protect_en through the control end, the multiplexers 220, 222, 224, and 226 respectively send the control signal Md_ddr_clock_ena received from the multiplexers 212, 214, 216 and 218 to the system power controller 204**.

As shown in FIG. 2, the OR gate 228 has a first input end to receive the enable signal or the disable signal from the modem power controller 206 through the node A, and a second input end to receive the acknowledgment message md_apsrc_ack from the system power controller 204, and performs OR operation on the enable signal and the acknowledgment message md_apsrc_ack, or the disable signal and the acknowledgment message md_apsrc_ack, to obtain a first calculation result. The OR gate 230 has a first input end to receive the enable signal or the disable signal from the modem power controller 206 through the node B, and a second input end to receive the acknowledgment message md_emi_ack from the system power controller 204, and performs OR operation on the enable signal and the acknowledgment message md_emi_ack, or the disable signal and the acknowledgment message md_emi_ack, to obtain a second calculation result.

Similarly, the OR gate 232 has a first input end to receive the enable signal or the disable signal from the modem power controller 206 through the node C, and a second input end to receive the acknowledgment message md_vrf18_ack from the system power controller 204, and performs OR operation on the enable signal and the acknowledgment message md_vrf18_ack, or the disable signal and the acknowledgment message md_vrf18_ack, to obtain a third calculation result. The OR gate 234 has a first input end to receive the enable signal or the disable signal from the modem power controller 206 through the node D, and a second input end to receive the acknowledgment message md_infra_ack from the system power controller 204, and performs OR operation on the enable signal and the acknowledgment message md_infra_ack, or the disable signal and the acknowledgment message md_infra_ack, to obtain a fourth calculation result.

After that, the AND gate 236 performs AND operation on the first, second, third and fourth calculation result to obtain a ready message, and sends the ready message to the modem power controller 206. In some embodiments of FIG. 2, the ready message is divided into the ready message aoc2ap_emi_rdy, the ready message 11sm2ap_emi_rdy, and the ready message mdsm2ap_emi_rdy. The ready message aoc2ap_emi_rdy is received by the function block mdvlp_aoc_gc_peri of the modem power controller 206. The ready message 11sm2ap_emi_rdy is received by the function block 11_topsm of the modem power controller 206. The ready message mdsm2ap_emi_rdy is received by the function block md_topsm of the modem power controller 206. In some embodiments, after the modem power controller 206 receives the ready message from the AND gate 236 of the logic circuit 208, the modem power controller 206 knows that the system power controller 204 has pre-supplied power to the respective resources dynamically.

In some embodiments, when the modem power controller 206 determines to operate in the dynamic mode, the OR gates 228, 230, 232, and 234 respectively receive the enable signal through their own first input end, so that the calculation result for the respective resources (such as the first, second, third, and fourth calculation result) is equal to the enable signal for the respective resources, and the ready message aoc2ap_emi_rdy, the ready message 11sm2ap_emi_rdy, and the ready message mdsm2ap_emi_rdy are equal to the calculation result for the respective resources. Therefore, the acknowledgment message (for example, the acknowledgement message md_apsrc_ack, the acknowledgement message md_emi_ack, the acknowledgement message md_vrf18_ack, and the acknowledgement message md_infra_ack) for the respective resources is masked.

When the modem power controller 206 determines to operate in the static mode, the OR gates 228, 230, 232, and 234 respectively receive the disable signal through their own first input end, so that the calculation result for the respective resources is equal to the acknowledgment message for the respective resources (for example, the acknowledgement message md_apsrc_ack, the acknowledgement message md_emi_ack, the acknowledgement message md_vrf18_ack, and the acknowledgement message md_infra_ack) from the system power controller 204.

When the modem power controller 206 of the electronic device 200 determines to operate in the dynamic mode, since the system power controller 204 is able to pre-supply power to the respective resources based on the control signal Md_ddr_clock_ena, and the control signal Md_ddr_clock_ena is generated by the processor executing the dynamic resource-control software/hardware, the lead time when the system power controller 204 pre-supplies power to the respective resources can be accurately control, so that power consumption when all resources should be first occupied at first (such as, the electronic device 100) can be reduced. When the modem power controller 206 of the electronic device 200 determines to operate in the static mode, the operation of the electronic device 200 is the same as the electronic device 100.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic device, comprising:

a modem, configured to receive a control signal, and send out a resource request based on the control signal when the modem determines to operate in a dynamic mode for scheduling a plurality of resources; and a system power controller, configured to receive the resource request from the modem, and to supply power to at least one of the plurality of resources based on the resource request, wherein the modem comprises a modem power controller, configured to determine, for each of the plurality of resources, whether to operate in the dynamic mode or a static mode, and output an enabled signal or a disabled signal, respectively, based on the determination for each of the plurality of resources, wherein the control signal is generated based on different requirements on each of the plurality of resources;

wherein the system power controller sends an acknowledgment message back for each of the plurality of resources to the modem respectively, after the system power controller supplies power to each of the plurality of resources.

2. The electronic device as claimed in claim 1, wherein the control signal is generated by a processor executing dynamic resource-control software.

3. The electronic device as claimed in claim 2, wherein the processor executing the dynamic resource-control software calculates lead time when the system power controller supplies power to each of the resources based on the control signal.

4. The electronic device as claimed in claim 1, wherein each of the resources comprises a dynamic random-access memory, a clock, an infra bus, a bus phase-locked loop (PLL) or a power management integrated circuit.

5. The electronic device as claimed in claim 1, wherein the modem is configured to receive configurations from a base station through a Physical Downlink Control Channel (PDCCH).

6. The electronic device as claimed in claim 1, wherein the modem power controller is further configured to:

output the enabled signal for one of the plurality of resources when determining to operate in the dynamic mode; and output the disabled signal for one of the plurality of resources when determining to operate in the static mode.

7. The electronic device as claimed in claim 6, the modem further comprises:

a logic circuit, configured to:

receive the enabled signal and send the resource request to the system power controller when the modem power controller determines to operate in the dynamic mode, and receive the disabled signal and transfer a normal resource request from the modem power controller to the system power controller when the modem power controller determines to operate in the static mode.

8. The electronic device as claimed in claim 6, wherein the modem comprises a plurality of subsystems; the modem power controller controls switches in each of the subsystems to control timing for supplying the power to the subsystems.

9. The electronic device as claimed in claim 7, wherein the logic circuit comprises:

a first OR gate, configured to receive the resource request from the modem power controller and perform an OR operation on the resource request; and a plurality of first multiplexers, each of which having a first input end to receive the resource request, a second input end to receive the control signal, and a control end to receive the enabled signal or the disabled signal for each of the plurality of resources from the modem power controller.

10. The electronic device as claimed in claim 7, wherein the logic circuit further comprises:

second OR gates, each of which has a first input end to receive the enabled signal or the disabled signal for each of the plurality of resources from the modem power controller, and a second input end to receive an acknowledgment message for each of the plurality of resources from the system power controller, and configured to perform an OR operation on the enabled signal and the acknowledgment message, or the disabled signal and the acknowledgment message to obtain a calculation result for each of the resources; and an AND gate, configured to perform an AND operation on the calculation result for each of the plurality of resources to obtain a ready message, and send the ready message to the modem power controller.

11. The electronic device as claimed in claim 7, wherein the modem power controller outputs a protection signal to the logic circuit when the electronic device is turned off.

12. The electronic device as claimed in claim 9, wherein when the modem power controller determines to operate in the dynamic mode, at least one of the first multiplexers receives the enabled signal through the control end, so that at least one of the first multiplexers output the resource request to the system power controller based on the control signal in the second input.

13. The electronic device as claimed in claim 9, wherein when the modem power controller determines to operate in the static mode, at least one of the first multiplexers receives the disabled signal through the control end, so that at least one of the first multiplexers output the normal resource request from the modem controller to the system power controller.

14. The electronic device as claimed in claim 9, wherein the logic circuit further comprises:

a plurality of second multiplexers, each of which has a first input end to receive a logic-low signal, a second input end electrically connected to each of the first multiplexers, and a control end to receive a protection signal from the modem power controller when the electronic device is turned off.

15. The electronic device as claimed in claim 14, wherein when each of the second multiplexers receives the protection signal through the control end, the second multiplexers send the logic-low signal to the system power controller, so that the plurality of resources are released.

16. The electronic device as claimed in claim 14, wherein when each of the second multiplexers does not receive the protection signal through the control end, the second multiplexers send the resource request to the system power controller.

17. The electronic device as claimed in claim 10, wherein when the modem power controller determines to operate in the dynamic mode, at least one of the second OR gates receives the enabled signal through the first input end, so that the calculation result for each of the resources is equal to the enabled signal for each of the resources, and the acknowledgment message for each of the resources is masked.

18. The electronic device as claimed in claim 10, wherein when the modem power controller determines to operate in the static mode, each of the second OR gates receives the disable signal through the first input end, so that the calculation result for each of the resources is equal to the acknowledgment message for each of the resources from the system power controller.

19. The electronic device as claimed in claim 10, wherein after the modem power controller receives the ready message from the AND gate of the logic circuit, the modem power controller knows that the system power controller has supplied power to each of the resources.

* * * * *